United States Patent
Davison

(10) Patent No.: US 11,700,799 B2
(45) Date of Patent: Jul. 18, 2023

(54) POLYTUNNEL STRUCTURE WITH STEPPED SUPPORT MEMBERS FOR HOLDING ROTATABLE BEAM

(71) Applicant: HAYGROVE LIMITED, Ledbury (GB)

(72) Inventor: Angus Davison, Ledbury (GB)

(73) Assignee: HAYGROVE LIMITED, Ledbury (GB)

( * ) Notice: Subject to any disclaimer, the term of this patent is extended or adjusted under 35 U.S.C. 154(b) by 138 days.

(21) Appl. No.: 17/253,987

(22) PCT Filed: May 23, 2019

(86) PCT No.: PCT/GB2019/051414
§ 371 (c)(1),
(2) Date: Dec. 18, 2020

(87) PCT Pub. No.: WO2019/243769
PCT Pub. Date: Dec. 26, 2019

(65) Prior Publication Data
US 2021/0267140 A1    Sep. 2, 2021

(30) Foreign Application Priority Data
Jun. 19, 2018    (GB) ................................. 1810046

(51) Int. Cl.
*A01G 13/02*    (2006.01)

(52) U.S. Cl.
CPC ..... *A01G 13/0206* (2013.01); *A01G 13/0231* (2013.01)

(58) Field of Classification Search
CPC .................. A01G 13/0206; A01G 13/0231
See application file for complete search history.

(56) References Cited

U.S. PATENT DOCUMENTS 3,812,616 A * 5/1974 Koziol ................. A01G 9/16
47/29.1
5,564,234 A    10/1996 Vermeulen
(Continued)

FOREIGN PATENT DOCUMENTS

| CN | 104770246 A | 7/2015 |
| CN | 106538364 A | 3/2017 |

(Continued)

OTHER PUBLICATIONS

International Search Report for PCT/GB2019/051414, prepared by the European Patent Office, dated Sep. 19, 2019, 3 pages.

*Primary Examiner* — Jessica B Wong
(74) *Attorney, Agent, or Firm* — Brooks Kushman PC; John E. Nemazi

(57) ABSTRACT

A polytunnel structure is described having a plurality of cover support members supported upon respective pairs of legs, a cover member supported by the cover support members, an edge of the cover member being secured to a rotatable beam, and an anchor rope, strap or the like extending over the cover member to anchor the cover member in position, wherein the cover support members are each shaped to define a step between a first section and a second section, wherein when the rotatable beam is supported upon the second section, the anchor rope, strap or the like provides a reduced resistance to movement thereof.

11 Claims, 1 Drawing Sheet

(56) References Cited

U.S. PATENT DOCUMENTS

Figure 1:
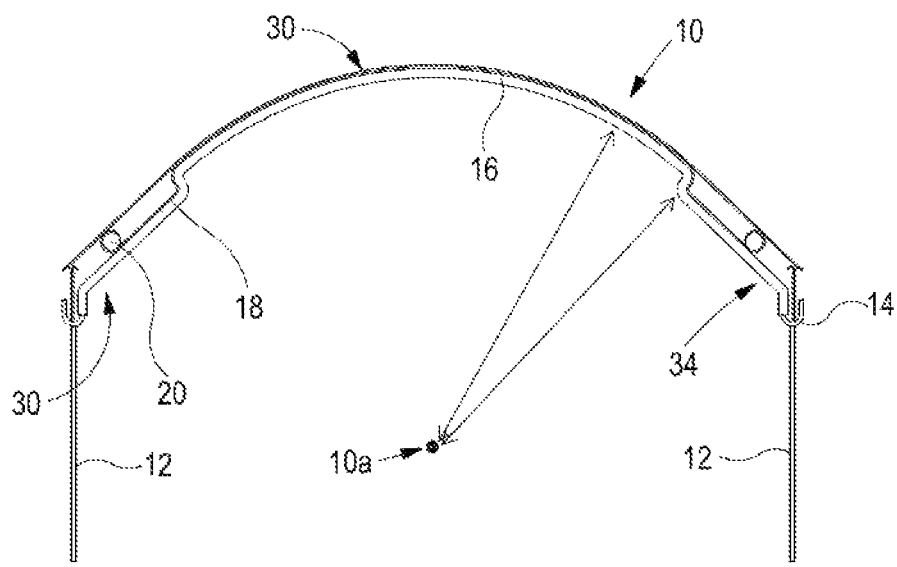

| | | |
|---|---|---|
| 6,260,308 B1 | 7/2001 | Looney |
| 6,843,019 B2 * | 1/2005 | Mercurio ............... A01G 9/242 |
| | | 52/63 |
| 2003/0182851 A1 * | 10/2003 | Lin .................... A01G 13/0231 |
| | | 47/2 |
| 2005/0268544 A1 * | 12/2005 | Maffei ............... A01G 13/0231 |
| | | 47/29.1 |
| 2015/0121750 A1 | 5/2015 | Looney |

FOREIGN PATENT DOCUMENTS

| | | | |
|---|---|---|---|
| GB | 782115 A | * | 9/1954 |
| JP | 2015142545 A | | 8/2015 |
| KR | 100250966 B1 | | 4/2000 |
| WO | 11095700 A2 | | 8/2011 |

* cited by examiner

POLYTUNNEL STRUCTURE WITH STEPPED SUPPORT MEMBERS FOR HOLDING ROTATABLE BEAM

CROSS-REFERENCE TO RELATED APPLICATION

This application is the U.S. national phase of PCT Application No. PCT/GB2019/051414 filed on May 23, 2019, which claims priority to GB Patent Application No. 1810046.1 filed on Jun. 19, 2018, the disclosures of which are incorporated in their entirety by reference herein.

This invention relates to a polytunnel structure, for example of the type used in the cultivation of crops to provide a controllable environment in which plants, trees or the like may be grown.

Where soft fruit crops and the like are grown on a commercial scale, it is increasingly common for the crops to be grown within polytunnel structures and the like. Doing so is beneficial in that the growing environment can be controlled, at least to an extent. By way of example, by growing the crops within a polytunnel structure, the temperature, humidity and the like can be controlled in such a manner as to better suit the crop being grown. In this manner, the season during which crops may be harvested may be extended, and crop production may be increased. Additionally, the polytunnel structure may provide protection for plants growing therein from, for example, high winds, heavy rainfall, or insect or other wildlife damage. The use of such structures may thus allow efficiencies in fruit production to be made.

One form of polytunnel structure in common use takes the form of a pair of rows of legs, each leg being anchored to the underlying ground surface in such a manner as to be upstanding. A plurality of arcuate cover support member are provided, each such member being supported at one end by one of the legs of one of the rows, and at its opposite end by a corresponding leg of the other of the rows. The cover support members together support a cover member in the form of a flexible plastics material sheet, the cover member being anchored in position by ropes or straps that extend over the cover material and which are anchored to, for example, brackets carried by the legs. The cover member defines a roof profile of substantially part cylindrical form.

Where several polytunnel structures are located adjacent one another, certain of the rows of legs may support cover support members associated with two adjacent ones of the polytunnel structures, rather than providing two rows of legs immediately adjacent one another.

In order to allow control over the temperature and/or humidity within the polytunnel structure, the lower edges of the cover material are typically attached to rotatable beams, rotation of which causes the cover material to become wound up upon the beams, thereby opening a vent region in the tunnel structure. Rotation of the beam in the opposite direction returns the vent region to its closed position.

It has been found that the tension in the ropes or straps used to secure the cover material in position tends to resist rotation and movement of beams, and so interferes with the operation to increase or decrease the level of ventilation. Accordingly, in order to allow the degree of ventilation to be adjusted, it is often first required that the ropes or straps be slackened so that the resistance to movement of the beams is reduced. This results in the operation to adjust the level of ventilation being more complex and time consuming than is desirable, and may result in the level of ventilation not being adjusted as frequently as would otherwise be desirable. Accordingly, the growing conditions within the polytunnel structure may be less suitable for growing crops than is desired.

Where several polytunnel structures are located side-by-side, adjusting the tension in some of the ropes or straps may be complicated by the ropes or straps being relatively difficult to access.

It is an object of the invention to provide a polytunnel structure in which at least some of the disadvantages associated with known polytunnel structures are overcome or are of reduced effect.

According to the present invention there is provided a polytunnel structure comprising a plurality of cover support members supported upon respective pairs of legs, a cover member supported by the cover support members, an edge of the cover member being secured to a rotatable beam, and an anchor rope, strap or the like extending over the cover member to anchor the cover member in position, wherein the cover support members are each shaped to define a step between a first section and a second section, wherein when the rotatable beam is supported upon the second section, the anchor rope, strap or the like provides a reduced resistance to movement thereof.

The first region is preferably a central region of the cover support member, and is preferably at a relatively large spacing from an axis of the cover support member, the second region being an edge region of the cover support member and being at a relatively small spacing from the axis.

It will be appreciated that the arrangement of the invention is advantageous in that adjusting ventilation of the polytunnel is simplified as rotation and movement of the beam can take place without needing to reduce the tension in the anchor rope, strap or the like.

Preferably, the cover support members are each shaped to define a second step between the first section and a third section of form similar to the second section, a second rotatable beam being secured to an opposite edge of the cover member. Such an arrangement is advantageous in that two vent regions may be provided, adjustment of the level of ventilation of both vent regions being possible without needing to reduce the tension in the anchor ropes, straps or the like.

The anchor rope, strap or the like is conveniently anchored to the legs, and the second region of the cover support member is preferably spaced below the anchor rope, strap or the like. The spacing of the second region from the anchor rope is preferably greater than 50% of the diameter of the beam. It may be less than the full diameter of the beam so that the anchor ropes, straps or the like still provide some resistance to movement of the beam so that the beam is held in the desired position to maintain the desired level of ventilation. The beam is thus held against undesired movement by the anchor ropes, straps or the like. The second region of the cover support member may be of arcuate form, in which case the spacing of the second region from the anchor rope, strap or the like will not be uniform. Alternatively, it may be of straight form in which case, depending upon the angles of the second region and the anchor rope, strap of the like, the spacing therebetween may be substantially uniform.

The first region is preferably of arcuate form.

The invention also relates to a cover support member adapted for use in the structure set out hereinbefore.

Figure 2:
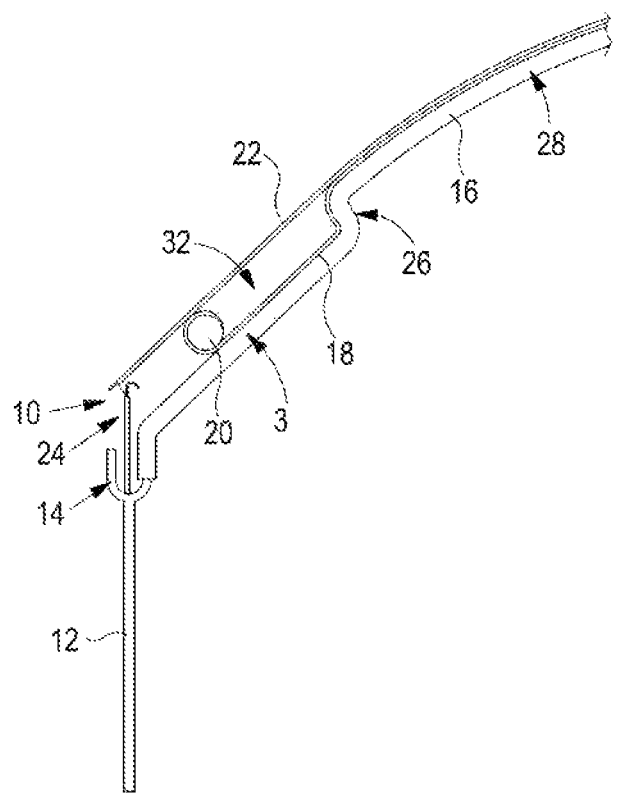

The invention will further be described, by way of example, with reference to the accompanying drawings, in which:

FIG. 1 is a diagrammatic view illustrating a polytunnel structure in accordance with an embodiment of the invention; and FIG. 2 is a view to an enlarged scale of part of the structure of FIG. 1.

Referring to the accompanying drawings, a polytunnel structure 10 is illustrated. The structure 10 comprises legs 12 arranged in parallel rows, the legs 12 being upstanding and substantially equally spaced apart. Each leg 12 includes, at its upper end, a generally U-shaped part 14. The structure 10 further comprises a series of cover support members 16. Each cover support member 16 is supported at one end by a leg 12 of one of the rows, and at its opposite end by a leg 12 of an adjacent one of the rows. Conveniently, the cover support members 16 are of hollow tubular form, and are supported by being slid over respective limbs of the generally U-shaped parts 14 of the legs 12. For clarity, only a single cover support member 16 and the associated legs 12 are shown in the drawings, but in reality a plurality of such cover support members 16 supported by respective pairs of legs 12 will be present.

A cover member 18 is supported upon the cover support members 16, the cover member 18 being of a suitable flexible plastics material such that the cover member 18 forms a roof of barrel like form, providing shelter to the interior of the polytunnel structure, and so protecting crops growing therein, in use, from heavy rain, strong winds, etc, and enabling control over the temperature and humidity levels within the polytunnel structure 10. The edges of the cover member are secured to respective rotatable beams 20 which rest upon the adjacent parts of the cover support members 16.

Anchor ropes 22, straps or the like extend over the cover member 18 and are secured to anchor points 24 associated with the respective legs 12 to anchor the cover member 18 in position. In the arrangement shown, each anchor rope 22, strap or the like is substantially aligned with an associated one of the cover support members 16 and is anchored to anchor points 24 associated with the legs 12 supporting that cover support member 16. It will be appreciated, however, that this need not always be the case and that other configurations are possible without departing from the scope of the invention.

The cover support members 16 are each shaped to define a step 26 between a first, radially outer, central region 28 and a second, radially inner, edge region 30, the radii being relative to an axis 10a of the structure 10. The first, outer region 28 is of arcuate form, and the second, inner region 30 is of substantially straight form. As shown, the anchor rope 22, strap or the like adopts an arcuate form as it extends over the first, outer region 28, but follows a substantially straight path between the step 26 and the associated anchor point 24, the anchor point 24 being positioned such that the anchor rope 22, strap or the like runs substantially parallel to and spaced from the inner region 30 so as to define a space 32 therebetween.

In normal use, as shown in FIG. 1, the beam 20 is located within the space 32. The spacing of the anchor rope 22, strap or the like from the second, inner region 30 is preferably substantially the same as or slightly smaller than the diameter of the beam 20 such that rotation and movement of the beam 20 is only relatively lightly resisted by the presence of and tension in the anchor rope 22, strap or the like.

A motor, hand crank or other actuator (not shown) is attached to or attachable to the beam 20 to drive the beam 20 for rotation. It will be appreciated that, in use, rotation of the beam 20 in one rotary direction serves to wind the cover member 18 onto the beam 20 and causes the beam 20 to roll upwardly along the second, inner region 30, thereby increasing the level of ventilation. Rotation of the beam 20 in the opposite direction causes the cover member 18 to unwind from the beam 20, the beam 20 rolling in the opposite direction and reducing the level of ventilation. Whilst the beam 20 is located within the space 32, the resistance to rotation and movement of the beam 20 due to the presence and tension in the anchor ropes 22, straps or the like is relatively low and so adjustment of the level of ventilation may be undertaken without needing to adjust the tension in the anchor ropes 22, straps or the like. Adjustment of the level of ventilation may thus be undertaken in a relatively quick and simple manner.

As shown, the cover support members 16 conveniently each include a third, radially inner edge region 34 of form similar to the second, inner region 30, allowing ventilation of both sides of the structure 10 to be undertaken relatively simply.

Preferably, the spacing of the anchor ropes 22, straps or the like from the inner regions 30, 34 is slightly less than the diameter of the beam 20 so that the anchor ropes 22, straps or the like continue to apply a small load resisting movement of the beams 20 so as to retain the beams 20 against movement other than when being positively driven for rotation to adjust ventilation. However, this need not always be the case and arrangements are possible in which a larger spacing is present and other means are provided to hold the beams 20 against undesired movement when the degree of ventilation is not being adjusted. Preferably the spacing is at least 50% of the diameter of the beams 20.

There may be circumstances in which it is desired to substantially completely wind up the cover member 18 onto the beams 20, for example outside of the growing season, or in the event of winds of sufficient strength that damage to the structure 10 would be likely to occur if the cover member 18 were left in its normal, in use position. To achieve this, the anchor ropes 22, straps or the like are slackened to allow the beams 20 to be driven to ride up the steps 26 and over the first, outer region 28 to, for example, the uppermost part of the first, outer region 28, where the beams 20 can be fixed in position.

It is envisaged that the step 26 will be approximately 2 m inboard of the legs 12, thereby providing a relatively large range of relatively unimpeded movement of the beams 20. However, the invention is not restricted in this regard.

In many applications, several polytunnel structures 10 are arranged side-by-side, certain of the rows of legs 12 supporting cover support members associated with two adjacent ones of the polytunnel structures 10, and the invention is applicable to such arrangements.

Whilst a specific embodiment of the invention is described and illustrated herein, it will be appreciated that a range of modifications and alterations may be made thereto without departing from the scope of the invention as defined by the appended claims.

The invention claimed is:

1. A polytunnel structure for cultivating crops, the polytunnel structure comprising a plurality of cover support members supported upon respective pairs of legs, a cover member supported by the cover support members, an edge of the cover member being secured to a rotatable beam, and an anchor rope, strap or the like extending over the cover member to anchor the cover member in position, wherein the cover support members are each shaped to define a step between a first section and a second section such that the second section provides spacing from the anchor rope, strap or the like, wherein when the rotatable beam is supported upon the second section, whereby the spacing of the second section from the anchor rope, strap or the like provides a reduced resistance to movement of the rotatable beam when it is rolled along the second section for winding or unwinding underneath the anchor rope, strap or the like.

2. The polytunnel structure according to claim 1, wherein the first section is a central section of the cover support member, and is at a relatively large spacing from an axis of the cover support member, the second section being an edge region of the cover support member and being at a relatively small spacing from the axis.

3. The polytunnel structure according to claim 1, wherein the cover support members are each shaped to define a second step between the first section and a third section of form similar to the second section, a second rotatable beam being secured to an opposite edge of the cover member.

4. The polytunnel structure according to claim 1, wherein the anchor rope, strap or the like is anchored to the legs, and the second section of the cover support member is spaced below the anchor rope, strap or the like.

5. The polytunnel structure according to claim 4, wherein the spacing of the second section from the anchor rope is greater than 50% of the diameter of the beam.

6. The polytunnel structure according to claim 4, wherein the spacing of the second section from the anchor rope is less than the full diameter of the beam.

7. The polytunnel structure according to claim 1, wherein the second section of the cover support member is of arcuate form, in which case the spacing of the second section from the anchor rope, strap or the like will not be uniform.

8. The polytunnel structure according to claim 1, wherein the second section of straight form.

9. The polytunnel structure according to claim 8, wherein the spacing between the anchor rope, strap or the like and the second section is substantially uniform.

10. The polytunnel structure according to claim 1, wherein the first section is of arcuate form.

11. A cover support member adapted for use in the structure of claim 1, the cover support member being shaped to define a step between a first section and a second section thereof such that, in use, the second section provides spacing from an anchor rope, strap or the like of the structure, so that, when a rotatable beam is supported upon the second section, the spacing of the second section from the anchor rope, strap or the like provides a reduced resistance to movement of the rotatable beam underneath the anchor rope, strap or the like.

* * * * *